March 17, 1970 T. H. O. ALMÉN 3,500,820
MEDICAL PROBE FOR INJECTING X-RAY CONTRAST MEDIUM
INTO THE BODY
Filed July 1, 1966 3 Sheets-Sheet 1
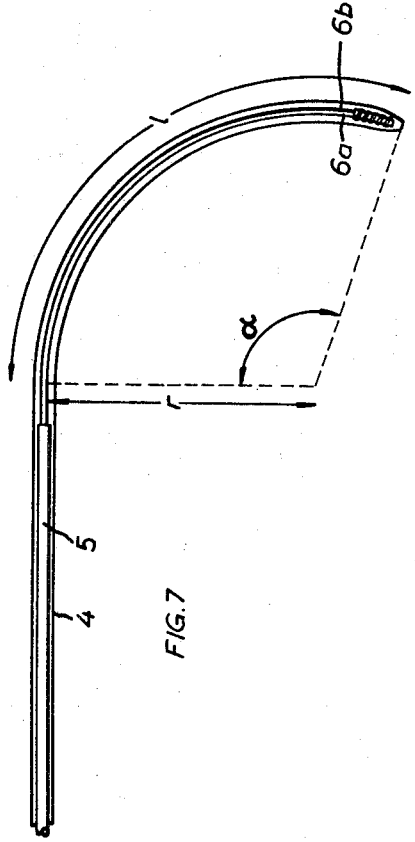
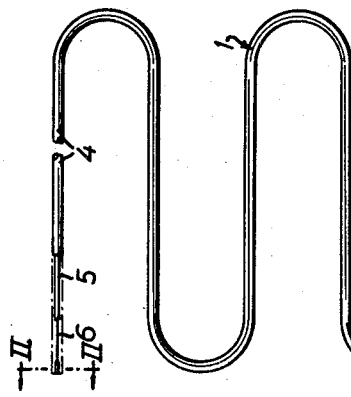
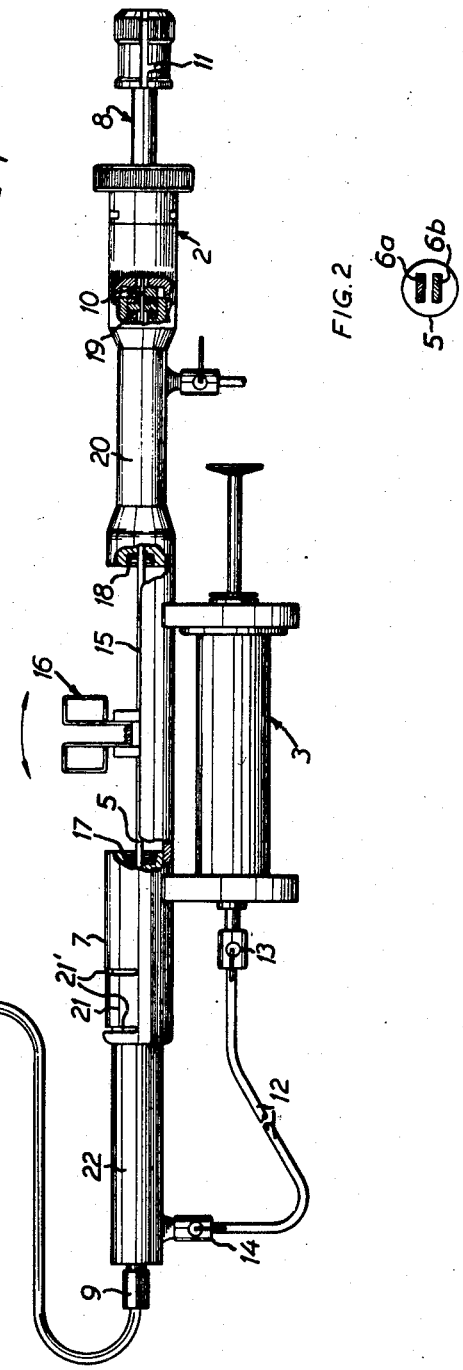
INVENTOR
TORSTEN HAKAN OSKAR ALMÉN
BY
Wenderoth, Lind & Ponack
ATTORNEYS

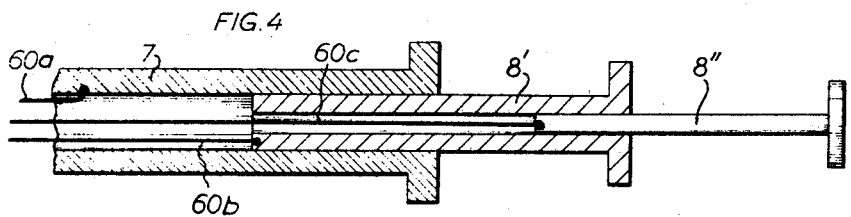
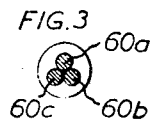
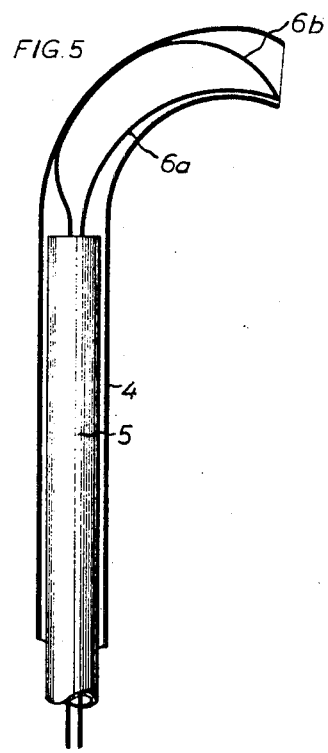
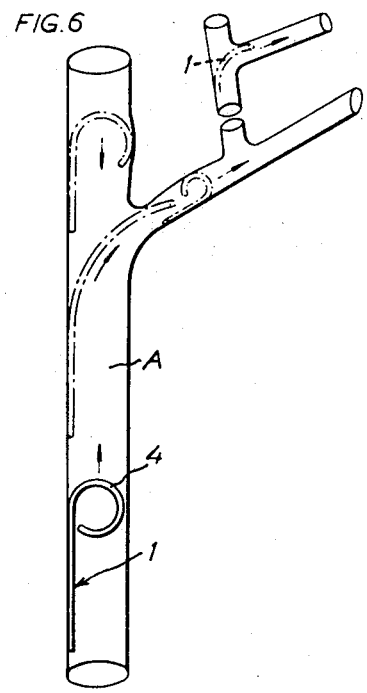

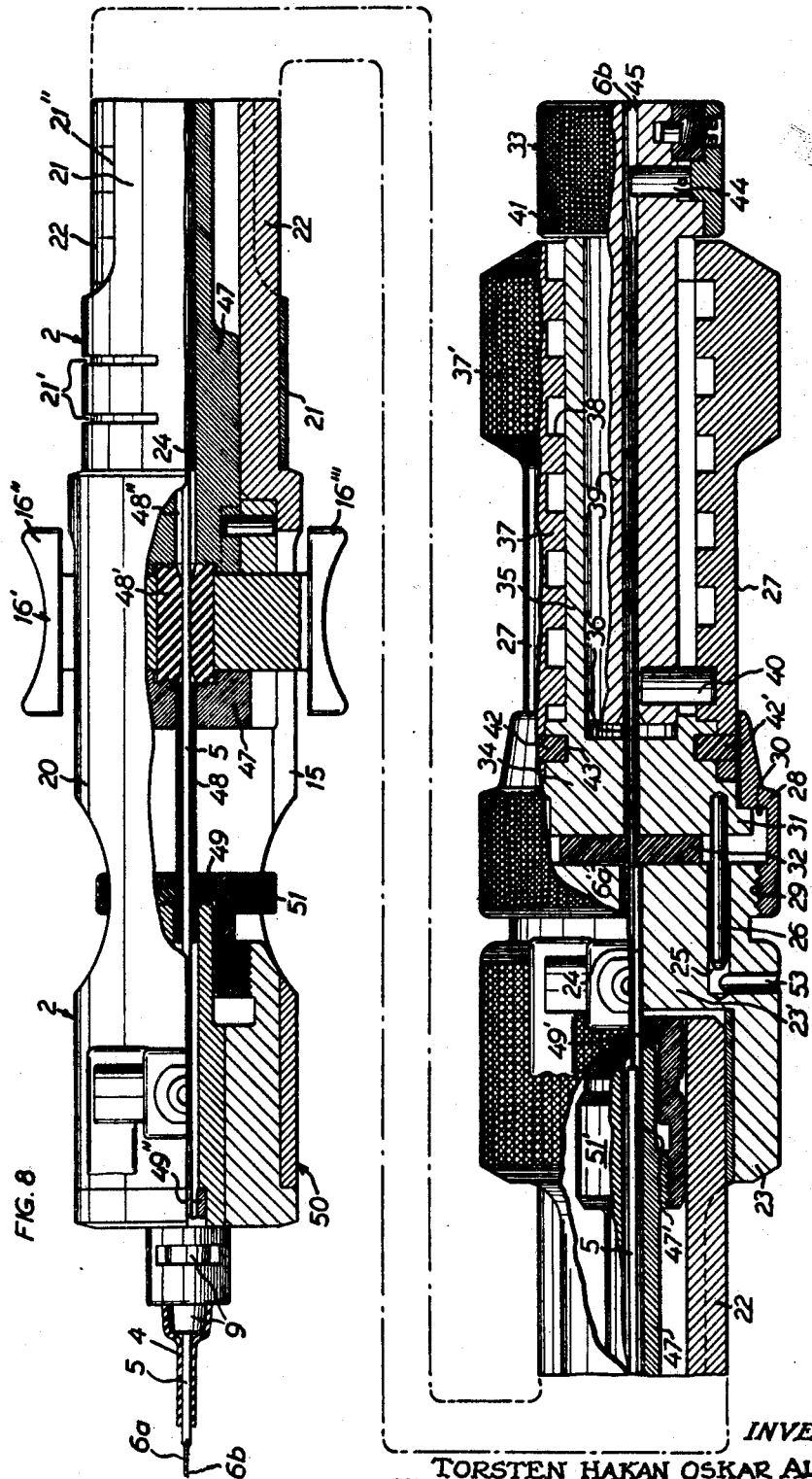

United States Patent Office 3,500,820
Patented Mar. 17, 1970

3,500,820
MEDICAL PROBE FOR INJECTING X-RAY CONTRAST MEDIUM INTO THE BODY
Torsten Hakan Oskar Almén, Lansmansvagen, Kaglinge, Lockarp, Sweden
Filed July 1, 1966, Ser. No. 562,150
Claims priority, application Sweden, July 5, 1965, 8,832/65
Int. Cl. A61b 6/00; A61m 25/00
U.S. Cl. 128—2                                    11 Claims

ABSTRACT OF THE DISCLOSURE

This invention relates to medical instruments to be introduced into a living body through a confined passage or system of canals, such as the vascular system, for examination, treatment or other purposes in the body, said instrument comprising a flexible tube and an element movable in said tube. The main characteristic features of the instrument suggested by the present invention reside in that the element includes at least two and sometimes three threads of stiff but flexible resilient material, such as plastic or metal, extending through the tube and shiftably united at their inner and outer ends, said threads being movable back and forth in relation to each other and to the tube as well as the tube being axially shiftable in relation to the element, to bend the front end portion of the element, such bend being controllable by the size of the lengthening or shortening of the threads in relation to each other and by the length to which said front end portion of the element is projected from the front end of the tube.

---

The medical instrument according to the present invention can be used for different purposes in connection with the examination and treatment of for example the human body by introducing it into relatively narrow passages and causing it to deviate from a straight path while it is guided by means of said adjustable bend at the front end portion of the element, which facilitates the use of the instrument, e.g., for effecting treatments or making examinations at locations otherwise difficult to get at.

The instrument according to the invention is particularly useful for taking certain measures or making examinations in such parts of the human body as are accessible via the vascular system.

It is already known to introduce for example via some of the thigh or neck arteries a probe in the aorta and to locate with said probe a suitable spot for the injection of contrast medium into any desired artery through a hose connected to the probe. It has proved difficult to guide the hose to the correct artery mouth in the aorta and still more difficult to guide the hose a given distance into the artery so that the contrast medium is brought to the very spot to be examined for example by X-rays. Various methods have been suggested for the solution of this problem. One suggestion is to use a plastic hose curved at one end, which hose can be straightened and passed onto the probe whereupon the end of the plastic hose is again curved when it has reached and left the end of the probe. The intention is that the plastic hose shall then be opposite the artery into which the contrast medium is to be injected, but since guiding must be effected from outside it will readily be understood that the method can be realized only under favourable conditions and requires great skill. Another suggestion is to guide the probe or hose into the correct artery magnetically with the use of movable or otherwise controllable magnets outside the body, which necessitates an expensive equipment and specialized personnel. In both cases the movements of the probe or hose can be observed by X-rays. The mouth of the artery cannot, however, be observed but must be located in another way, for instance by orientation with the aid of the position of body organs observable by means of X-rays in relation to the end of the probe or hose, or exclusively by the physician's experience and skill.

The present invention highly simplifies the introduction of such an instrument into the human body in that the element movable in the flexible tube after the insertion for example in the aorta can be bent and straightened at will at its outer end portion by manipulation of the element from outside, which facilitates tracing the mouths of the arteries and the insertion of the instrument to the desired spot in the vascular system. It will be possible to introduce for example a probe or catheter more readily and more rapidly than hitherto into the desired artery or to the mouth of the desired artery.

The said probe or catheter may constitute the flexible tube, in which case the element is arranged in such a way in relation to the tube as to enable extraction from the tube after the latter has been guided to the desired spot in a human body.

In a preferred embodiment the instrument comprises a flexible outer hose which is arranged to enclose at least the main portion of the flexible tube and the element and to extend to the outer end of the latter in order to form a protective sheath about said tube and element at the insertion of the instrument, the hose being adapted to permit bending the outer end portion of the element which is situated in the hose, such bend being determined within angular limits by the width and, wherever applicable, the elasticity of the hose. The hose after retraction of the tube and the element therefrom can be utilized as an aid for the intended treatment or examination.

The hose and the tube may consist of flexible resilient material, the tube preferably including an X-ray-opaque material embedded in the plastic material.

In a simple and practical construction the flexible element comprises two relatively thin wires substantially of rectangular cross-section and preferably made from spring steel, said wires being integral or united at their outer ends, preferably by welding or soldering. This construction of the wires will make it possible by lengthening or shortening one wire relative to the other to determine the bend of the outer end portion of the element in two opposite directions at right angles to the flat faces of the wires.

In another preferred embodiment the element comprises three resilient metal wires preferably of round cross-section, which have their united, preferably soldered or welded-together outer ends placed symmetrically at the apices of an equilateral triangle. This will make it possible to bend the outer end portion of the element comprising the three wires in any desired direction by suitable displacement of the wires in relation to each other.

The instrument preferably comprises a handle for guiding and manipulating the instrument and including a hollow main portion having means for receiving and detachably retaining the rear end portions of the hose, the tube and one of the element wires, and at least a second handle portion which is movably guided in the hollow main portion of the handle and includes fastening means for the rear end of at least a second one of said three wires, said second wire extending in a forward direction from said second handle portion through the hollow main portion of the handle. To facilitate mounting of the instrument parts to the handle and cleaning thereof the main portion of the handle may consist of several dismountable tubular parts.

In an element made up of three wires the handle in addition to said tubular main portion comprises two further handle portions which are individually movable in relation to the main portion and are each provided with fastening means for one of two instrument wires, while the third wire is connected to the main portion of the handle. One of these two further handle portions which are movable in relation to the handle main portion may be in the form of a tube in which the third handle portion is movably guided.

These and further features of the medical instrument according to the invention will become apparent from the following detail description in which reference is made to the accompanying drawings in which:

FIG. 1 is a side elevational view of the instrument with certain portions of the instrument handle broken away for illustrating otherwise concealed details;

FIG. 2 is a cross-sectional view, on a larger scale, of the catheter of the instrument on line II—II in FIG. 1;

FIG. 3 is a similar cross-sectional view of a modified catheter;

FIG. 4 is a diagrammatic longitudinal sectional view of the handle of an instrument equipped with a catheter of the construction shown in FIG. 3;

FIG. 5 is a diagrammatic view illustrating the bend of the outer end portion of the instrument, realized in accordance with the invention;

FIG. 6 is a diagrammatic view of the front portion of the instrument in a number of possible positions during the insertion through the vascular system to a given artery.

FIG. 7 is a diagrammatic view illustrating the relation between the radius, angle and arc-length of a bend.

FIG. 8 is a composite side elevational and longitudinal sectional view of a modification of the handle in FIG. 1.

The instrument shown in FIG. 1 comprises a catheter portion 1 and a handle 2 having an injection syringe 3 mounted thereon. The catheter portion 1 consists of a catheter in the form of an outer hose 4 of flexible synthetic plastics, a tube 5 of flexible resilient synthetic plastics inserted in the hose and movable therein, and an element 6 inserted in the tube and movable therein. The element 6 in turn consists of two relatively thin narrow wires 6a, 6b, FIG. 2, of substantially rectangular cross section and preferably of spring steel, said wires having their outer ends soldered together or otherwise united.

The handle 2 is composed of a tubular main portion 7 and a rod-shaped portion 8 movably guided in the rear end of the main portion. The tubular main portion 7 at the front end has a nipple 9 at which the rear end of the hose 4 is received, and a through passage receiving the rear end portion of the tube 5 and the element 6. The tube 5 and the element 6 thus pass through the nipple and rearwardly through the passage of the tubular handle portion 7, the tube 5 terminating at a point approximately midway between the ends of said handle portion, while the wires of the element 6 run farther rearwardly, one wire 6a being secured to a wire holder 10 in the tubular handle portion 7 and the other wire 6b passing throughout said portion and through a passage in the rod-shaped portion 8 of the handle to a wire holder 11 which is connected to the handle portion 8.

The catheter of instrument portion 1 including the hose 4, the catheter tube 5 and the element 6 is in its entirety easily flexible but at the same time sufficiently stiff to permit being pushed into and advanced in the vascular system of the human body. As will appear from the following description the element 6 and hose 5 can be conveniently operated by means of the handle 2 to facilitate the introduction of the catheter to the location intended. In the course of insertion of the instrument the hose 4 normally exends up to and possbily slightly beyond the outer end of the element 6 so as to form a contact protection between the wires 6a, 6b of the element and the walls of the vessels. The tube 5 on the other hand normally leaves uncovered a smaller or greater portion of the element 6 at the extreme end thereof.

In the FIG. 1 position of the handle portion 8 the wires 6a, 6b, without any lengthening or shortening of one wire in relation to the other, run in parallel to the place of junction at their outer ends. By telescoping of the movable handle portion 8 in relation to the handle portion 7 the wire 6b connected to the first mentioned handle portion may, however, be shortened or lengthened in relation to the wire 6a connected to the handle portion 7. Due to the fact that both wires 6a, 6b are guided in the tube 5 up to the outer end portion of the element 6 the relative lengthening of one wire is taken up by the end portion thereof being curved towards the other wire, whereby the entire end portion of the element 6 is bent inside the hose 4 which in turn will thus be bent approximately in the manner of a finger the tendons of which are formed by said wires. By reason of the rectangular shape of the wires 6a, 6b the bending takes place at right angles to the flat faces of the wires. The bending movement can therefore be determined in two opposed directions by lengthening or shortening of one wire relative to the other, i.e. by a telescoping movement of the handle member 8. The length by which the outer end portion of the instrument 1 is thus bent can be determined by moving the tube 5 forwardly or rearwardly on the element 6 so that a smaller or greater end part of the element is uncovered by the tube. As the largest possible length difference between the wires is at least partially determined by the width of the outer hose 4 said width is also at least partially determinative of the maximum bending angle. After a bend has been provided at the outer end portion of the instrument 1 the shape of the bend is not as a rule changed if the tube 5 is pulled rearwardly.

FIG. 6 diagrammatically shows an example of the use of the instrument according to the invention. The flexible instrument 1 is introduced via an operation cut, for instance in the thigh artery, and is moved up in the aorta A, in doing which the instrument can be turned to the desired angular position with the aid of the handle 2 and the outer end portion of the instrument can be bent in one or the other of two opposite directions and again be straightened like a finger by means of the handle portion 8 in the manner described above, which facilitates guiding the instrument into the desired artery. The end portion of the instrument is shown in FIG. 6 in three positions, chosen by way of example, and in different states of bending.

The introduction of the instrument can be effected under X-ray control as the catheter 6 is of metal. To permit observation also of the position of the plastic tube 5 in relation to the element 6, lead or other X-ray-opaque material can be embedded in the plastic.

After the introduction of the instrument to the desired spot the element 6 can be extracted from the tube 5 and the hose 4 be pulled rearwardly to leave the tube mouth free. It is also possible to retract both the element 6 and the tube 5 from the hose 4 so that the hose remains with its mouth at the desired point. The hose 4 or the tube 5, whichever is to be used, can then be exploited for examination, treatment or other purposes, such as the introduction of a contrast medium, an observation instrument or a treatment or operating instrument.

FIG. 7 diagrammatically illustrates the manipulation of the outer end portion of the catheter or hose 4, which is made possible by the invention. By reason of the combined action of the tube 5 and the wires 6a, 6b both the arc angle $\alpha$ and the radius $r$ for the bend at the outer end portion of the catheter can be fully satisfactorily controlled. By moving the inner tube 5 (which can be realized by means of the clamping device 16) closer to or farther away from the end of the catheter or hose 4 it is possible to choose the desired bending radius r, and by displacing one wire, for example 6a, more or less in relation to the other wire 6b, the angle α of the arc can be controlled. The length l of the arc can thus be optionally adjusted since l=r·α if the angle α is given in radians.

FIG. 8 illustrates a further modification of the handle in FIG. 1, the upper half of FIG. 8 showing the front portion and the lower half of FIG. 8 showing the rear portion of the instrument. Like the handle in FIG. 1, the handle 2 in FIG. 8 is intended for an instrument having a catheter 4 manipulated by means of two wires 6a, 6b. The sleeve-shaped handle main portion corresponding to the portion 7 of FIG. 1 comprises two detachable parts 20 and 21 which both are tubular. The tubular front part 20 has a rear end portion 22 of reduced diameter which is telescopically insertable in the other tubular rear part 21. The tubular rear part 21 has several slots or recesses, such as two elongated recesses or "windows" 21', and carries at its rear end a head 23 in the form of a sleeve which is connected by press fit to the tubular part 21 and has a rear end wall 23' which has a central hole for the passage of the two wires 6a, 6b, and carries a narrow tube 24 inserted in said central hole and extending in a forward direction through the tubular handle portion 21 concentrically therewith. The tube 24 extends in a forward direction substantially to the front end of the handle portion 21 and serves as a guide for the wires 6a, 6b. In its outer or rear end surface the wall 23' has two diametrically opposed bores 25 which accommodate a pair of conforming or orienting pins 26 or a wire manipulating part 27 of the handle 2, which part can be mounted in the manner of a plug on the end wall 23'. The manipulating part 27 carries on its front end portion a threaded collar 28 which is freely rotatable on the manipulating part 27 and has internal threads to engage external threads 29 on the periphery of the end wall 23'. On screwing fast the collar 28 onto the handle portion 21, an inner shoulder 30 of the collar abuts against a flange 31 formed on the front end of the manipulating part 27 whereby the collar 28 when screwed into the handle portion 21 tightens the manipulating part 27 against the end wall 23' of the handle portion 21. Between the adjoining end surfaces of these parts there may be disposed a disk-shaped packing 32 which has a central aperture for the passage of one wire 6b. The other wire 6a is clamped with a bent end portion 6a' between the packing 32 and the rear end surface of the end wall 23'. The wire 6b runs rearwardly through the manipulating part 27 and is clamped with its rear end to the rear end of the manipulating part by means of a wire holder generally designated 33. In the embodiment shown in FIG. 8 the manipulating part 27 is composed of four detachable elements. The front element is tubular and is constituted by a front head 34 supporting the pins 26, and a tubular rear extension 35. The head 34 has a central aperture for the passage of the wire 6b and carries a narrow central tube 36 which extends rearwardly from said aperture coaxially through the tubular rear extension 35 to form a guide for the wire 6b. The tubular extension 35 is received in a sleeve 37 which at the rear end has a knurled head 37'. Said sleeve 37 has helical coarse internal threads 38 of high pitch and of rectangular cross-section. In the sleeve 37 is received a rod-shaped part 39 which at the front end has a pin 40 of a cross-section conforming to and engaging the internal threads 38. At the rear end the rod 39 carries a knurled ring 41 the function of which is described more in detail in the following. The sleeve 37 is freely rotatable on the sleeve-shaped portion 35 but is axially immobilized to this portion by two locking means 42, 42' which are inserted from outside through the slots in the wall of the sleeve 37 into an annular groove 43 between the head 34 and the sleeve-shaped portion 35. By rotation of the head 37' of the sleeve 37 in opposite directions the rod 39 which has its pin 40 engaging the internal threads 38 of the sleeve 37 can be axially reciprocated to move the wire 6b back and forth in the handle in relation to the wire 6a.

As will appear from FIG. 8 the knurled ring 41 on the outer end of the rod 39 is rotatable and carries on its inner side a pin 44 which extends through a slot in the end portion of the rod 39 into an axial passage 45 through the rod, said passage accommodating the tube 36. However, the tube 36 terminates short of the outer end portion of the rod 39, and the wire 6b runs with clearance through the rear end portion of the passage 45. The pin 44 has an oblique end surface whereby the wire 6b can be clamped in the passage 45 by rotation of the knurled ring 41.

As will have appeared from the foregoing a central wire passage extends from the rear end of the handle 2 through the parts 39, 34, 32, 23 and 22. To the greater part this passage is formed by the described tubes 24 and 36 the adjoining ends of which are interconnected by way of the openings in the packing 32 and the holes in the end walls, adjoining the packing, of the head 23 of the sleeve-shaped portion 21 and the "plug" 34. It will also appear that one wire 6a has the curved rear end portion 6a' anchored to the rear surface of the end wall 23 and that the other wire 6b extends up to and is anchored in the rear end portion of the passage 45 and is reciprocable in the handle for bending the outer end portion of the catheter 4.

The front handle portion 20 contains a tubular slide 47 movable therein and including a central tube 48 which constitutes an extension of the guide tube for the wires 6a, 6b but has a slightly larger inner diameter than the wires in order to accommodate also the tube 5. The latter enters the handle 2 through the nipple 9 at the outer end of the handle portion 22, sealed forwardly by sealing ring 49 and extends rearwardly into the handle through a substantial portion of the length of the slide 47. The slide 47 is movable from outside the handle with the aid of a clamping device 16' which is of a modified form relative to the clamping device 16 in the embodiment according to FIG. 1. The clamping device comprises two jaws 16", 16''' which pass through slots 15 in the handle portion 20 up to a flexible sleeve 48' which connects the tube 48 to a tubular extension 48" in the rear portion of the slide 47. At the tightening of the jaws 16", 16''' the flexible sleeve 48' is clamped about the rear end portion of the tube 5 whereby the latter can be advanced or retracted stepwise in relation to the wires 6a, 6b in the handle portion, each such step corresponding at most to the length of the slot 15. The tube 48 runs in a forward direction to a tubular front end portion 50 which carries the nipple 9 and is connected to the front end portion of the handle part 20 by means of a bayonet catch or like readily detachable connection. The tube 48 extends into a central passage in the front end portion 50 and is sealed therein by means of a sealing ring 49. The seal for the tube 48 is combined with a nut 51 operable from outside the handle and engaging internal threads of the front end portion 50, said nut 51 allowing the sealing ring 49 to be tightened about the tube 48 to provide a reliable seal simultaneously as a displacement of the tube 48 in the sealing ring is allowed on moving the slide 47. Provided at the rear end of the slide 47 is a similar sealing device comprising a nut 51' engaging the tubular rear extension 47' of the slide 47, and a sealing ring 49' disposed in the nut around the end of tubular extension 47'. However, this latter sealing device 51', 49' is movable together with the slide 47.

The flexible outer hose 4, i.e. the catheter proper, can be tightly connected with the end of the nipple 9 and coupled to, for example, a syringe 3 of the type shown in FIG. 1. The handle in FIG. 8 furthermore has an opening 53 which is provided with a system of channels through which air or liquid in the instrument can be evacuated. The opening 53 may be equipped with a suitable shut-off valve (not shown). Moreover, the instrument may have a device similar to the device 14 in FIG. 1, which can also be used for evacuation of air and liquid in the front portion of the instrument and possibly in the tube 5.

After insertion of the catheter or hose 4 it is possible to withdraw the wires 6a, 6b and the tube 5 so that the rear end of the hose 4 is left uncovered, say for the introduction of a contrast medium or other treating agent in a blood vessel or organ with the use of for example a syringe which is not connected to the handle 2.

The injection syringe 3 which in FIG. 1 is shown mounted on the handle portion 7 is given as an example of a possible means for introduction of liquid through the hose 4 or the tube 5. To prevent coagulation of the blood during the insertion of an instrument an anti-coagulation liquid may, if desired, be introduced between the tube 5 and the element 6 and if desired also between the tube 5 and the hose 4. Mounted at both ends of the pipe 12 connecting the injection syringe 3 to the tube 5 or the hose 4 are shut-off valves 13, 14 permitting shut-off of the connecting pipe 12 and the tube 5 or the hose 4 and connection of the two latter parts to another syringe or for example to a sampling apparatus.

As shown in FIG. 1 the handle member 7 has a slot or elongated opening 15 in its side wall. A spring clamp 16 projects through this opening into engagement with the tube 5. This clamp permits clamping of the tube 5 about the wires 6a, 6b, and by displacing the clamp 16 in either direction along the opening 15 the tube 5 can be moved on the wires. Sealing devices 17, 18 at the ends of the opening 15 prevent leakage and penetration of impurities. A further sealing device 19 is disposed about the wires 6a, 6b at the holder 10 in the handle portion 7 for one of these wires.

The handle portion 7 is constituted by three detachably assembled portions, viz a back member 20, an intermediate member 21 and a front member 22, which simplifies the mounting of the hose 4, the tube 5 and the element 6 and facilitates cleaning of the handle. The wire holder 10 (FIG. 1) for one wire 6a in the handle portion 7 can be a washer or like element with a hole for the insertion of a bent end of the wire 6a and another hole for insertion of the other wire 6b. The other wire holder 11 (FIG. 1) in the handle portion 8 may be formed by a slot in a back member 23 which is removably attached to the end of the rod of the handle portion 8.

FIG. 3 shows a modification of the element 6. This modification differs from the embodiment in FIGS. 1 and 2 in that the element 6 comprises three metal wires 60a, 60b and 60c of round cross section having the outer ends interconnected, as viewed in cross-section, at the apices of an isosceles triangle. By making two of these wires movable in relation to each other and to the third wire it is possible without turning the element 6 to determine the bending of the end portion or "finger" of the instrument in any sense whatever by suitable lengthening and/or shortening of the wires in relation to each other. FIG. 4 shows a possible arrangement of the handle 2 at the main portion 7 of which one wire 60a is secured. The other wire 60b is secured to a tubular handle portion 8' movable in the handle portion 7, and the third wire 60c is secured to a rod-shaped handle portion 8" movable in the handle portion 8'.

What I claim and desire to secure by Letters Patent is:

1. A medical instrument to be introduced into a living body through a confined passage or system of canals, such as a vascular system, for examination, treatment or other purposes in the body, said instrument comprising a flexible plastic tube having an open front terminal end, and an element movable in said tube, wherein the element comprises at least two strands of stiff but flexible resilient material, such as plastic or metal, extending through the tube and shiftably united at their inner and outer ends, means for freely selectively moving said threads back and forth during use in relation to each other and to the tube to bend said outer or front end portion of the element, means for said tube being axially shiftable to vary the position of said front end portion of said tube in relation to said element, whereby the relative shifting of said tube axially thereby controls the degree or radius of the bending of said element, with said bending of the element being controllable by the amount of the lengthening or shortening of said threads in relation to each other and by the length to which said front end portion of the element is projected beyond the front end of said tube.

2. A medical instrument as defined in claim 1 further including a flexible outer hose or catheter with means to slidably enclose at least the main portion of said tube and element with said catheter or hose when extending within a vascular passage to the outer end thereof to provide a protective sheath about the tube and the element during the insertion of the instrument, said outer hose being bent by said element and of a character to permit bending the outer end portion of the element, which is situated in said hose, within angular limits determined by the width, and wherever applicable, the elasticity of said hose, and means enabling said tube and element to be axially shiftable to the extent of complete removal from within said outer hose, after insertion within a body vascular passage or the like.

3. An instrument in accordance with claim 2, wherein said outer hose is movable on the instrument portion formed by the tube and the element.

4. An instrument in accordance with claim 2, comprising a handle including a hollow main portion equipped with means for receiving and detachably retaining the rear end portions of said outer hose and the tube and one of the wires of the element, and at least one second handle portion which is movably guided in the hollow main portion of the handle and includes means for retaining the rear end of at least another one of said wires, the last-mentioned wire running in a forward direction from said handle portion through the hollow main portion of the handle.

5. An instrument in accordance with claim 4, wherein the main portion of the handle consists of several dismountable sleeve parts, a front sleeve part having fastening means for said outer hose, an intermediate sleeve part having fastening means for the tube, and a rear sleeve part having fastening means for one of the wires and being formed as a guide member for the movable handle portion.

6. An instrument in accordance with claim 4, wherein the element comprises a third wire in addition to the first-mentioned two wires, the handle comprises two handle portions which are movable in relation to the tubular main portion of the handle and which are individually movable in relation to said main portion and each provided with fastening means for one of the two first-mentioned instrument wires, while said third wire is connected to the handle main portion.

7. An instrument in accordance with claim 6, wherein the second handle portion has the form of a tube in which the third handle portion is movably guided.

8. An instrument in accordance with claim 4, wherein the handle main portion has a slot and a clamping device introducible through said slot into the tube for clamping the tube against the wires.

9. An instrument in accordance with claim 2 wherein the element comprises two relatively thin wires substantially of rectangular section.

10. An instrument in accordance with claim 2 wherein the element comprises three wires, preferably of round section.

11. An instrument in accordance with claim 2 wherein the hose and the tube are made of flexible preferably resilient synthetic plastic, and said tube including an X-ray-opaque material embedded in the plastic.

(References on following page)

References Cited

UNITED STATES PATENTS

| | | | |
|---|---|---|---|
| 3,416,531 | 12/1968 | Edwards | 128—348 |
| 2,688,329 | 9/1954 | Wallace | 128—349 |
| 3,058,473 | 10/1962 | Whitehead | 128—349 |
| 3,091,235 | 5/1963 | Richards | 128—6 |
| 3,253,524 | 5/1966 | Ashizawa | 128—4 X |
| 3,270,641 | 9/1966 | Gosselin | 128—4 X |

FOREIGN PATENTS

| | | |
|---|---|---|
| 548,462 | 10/1942 | Great Britain. |
| 156,901 | 11/1956 | Sweden. |

DALTON L. TRULUCK, Primary Examiner

U.S. Cl. X.R.

128—303, 348, 356